United States Patent Office 3,140,654
Patented July 14, 1964

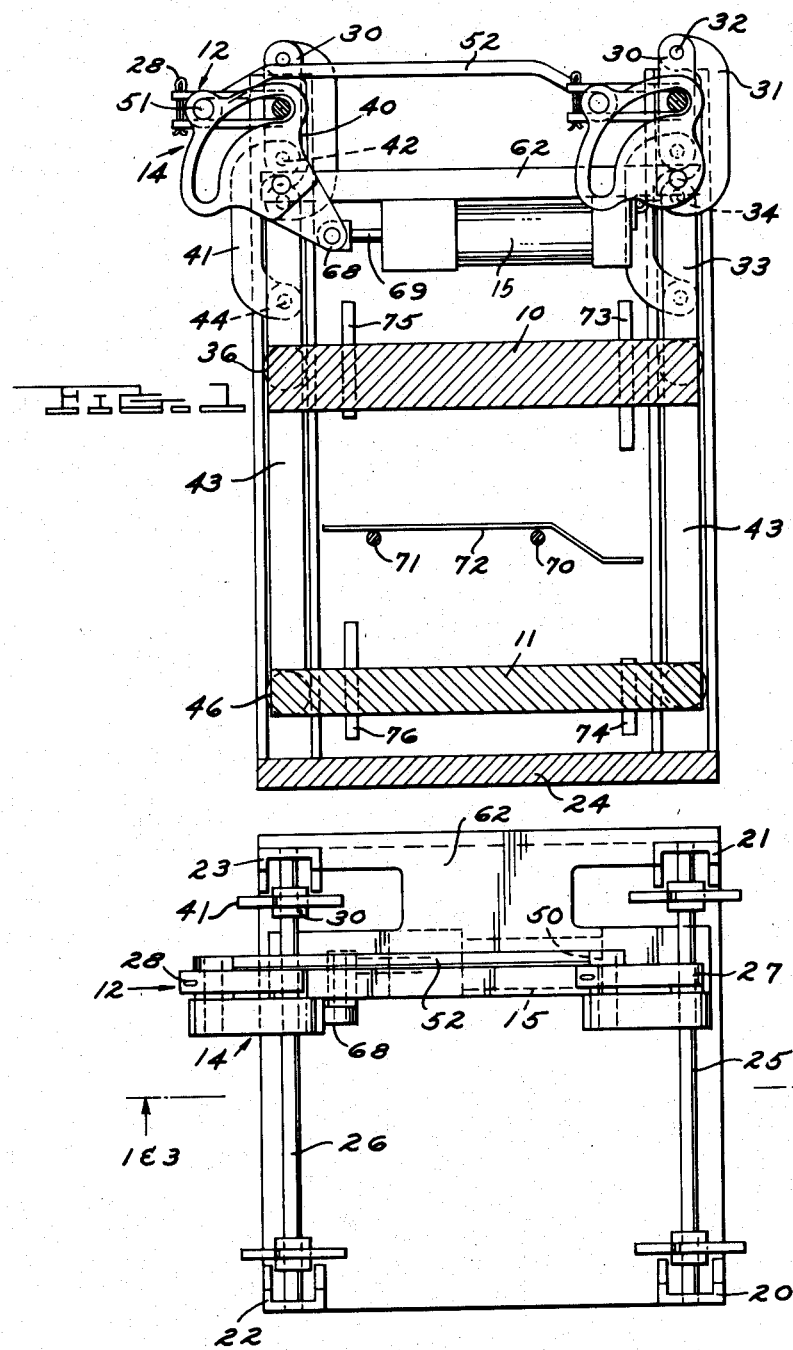

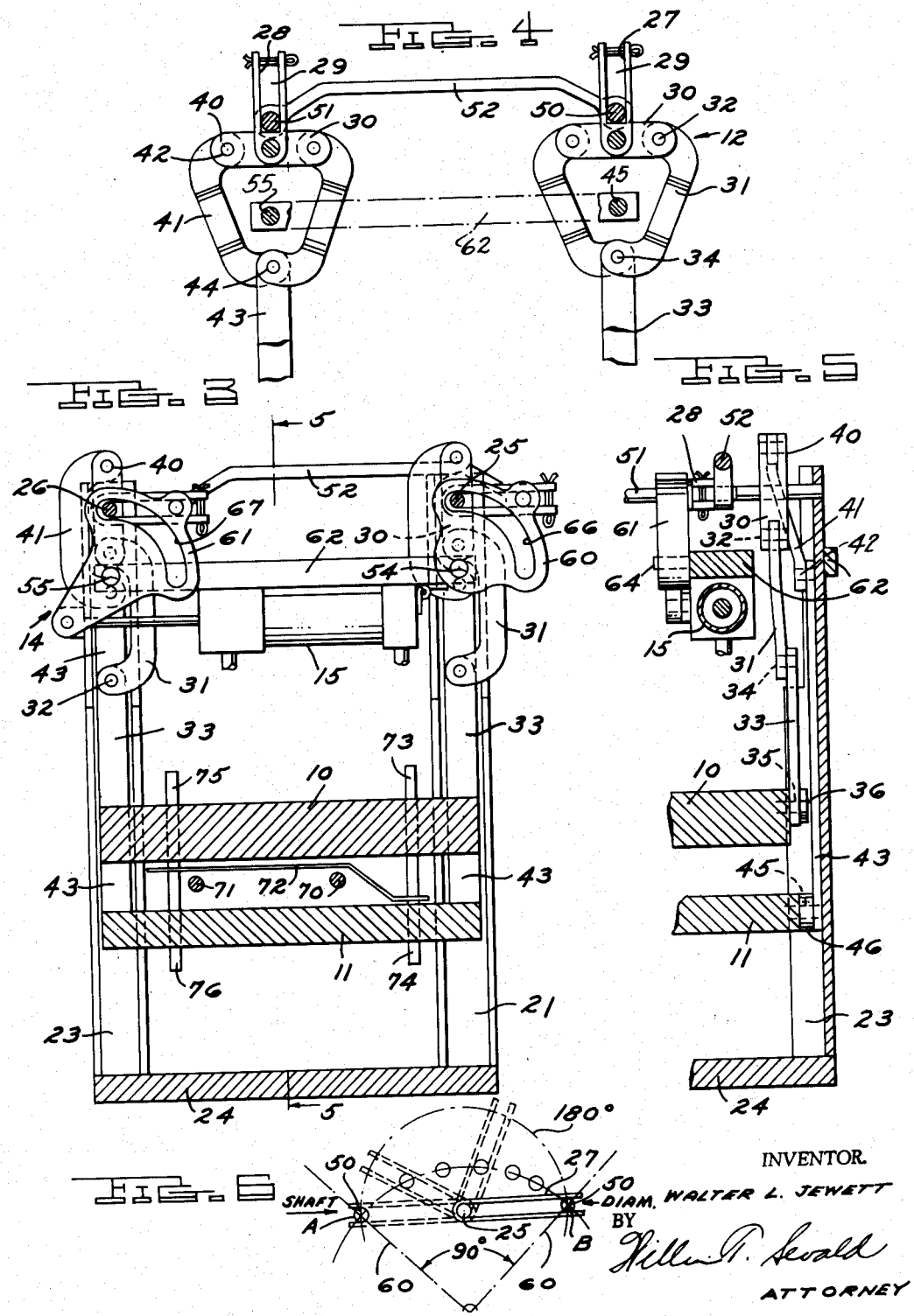

3,140,654
DOUBLE ACTING PRESS
Walter L. Jewett, Royal Oak, Mich., assignor to Allied Welder Corporation, Detroit, Mich., a corporation of Michigan
Filed June 14, 1962, Ser. No. 202,622
4 Claims. (Cl. 100—264)

This invention relates to a long stroke machine press having simple harmonic motion means moving two travelling platens towards one another to close the press and away from one another to open the press.

The platens carry tools such as multiple paired electrical spot welding electrodes and equipment, molds, and apparatus for deep-shell plastic "blow" or "vacuum" forming, or mating male and female dies or molds.

The actuating means moves the platens a long total stroke between a wide spaced open-height and any designed shut-height. The travel distance of the long total stroke is divided between the platens with each platen moving a portion of the distance in opening and closing the press. The press opens and closes at the combined travel speed of the platens.

The simple harmonic motion means moves the platens with minimum force and maximum speed and acceleration and deceleration in the middle of the stroke and maximum force and minimum speed and acceleration and deceleration at the ends of the stroke.

The actuating means includes a shaft having diametrically opposite cranks linked to opposed platens. The shaft and cranks balance the weight of one platen against the other. Equal balance may be designed. Counterweights may be used on a lighter platen to achieve equal balance. The balanced condition of the platens and their tools eliminates weight differential as a motive power factor in operating the press. It also eliminates any tendency of the press to move accidently under gravitational force.

The force and direction of movement of one crank is opposite to the other on either side of the shaft. The cranks move and force the platens in opposite directions toward one another and away from one another. The opposed movement and force between the platens is reacted between the cranks at the shaft. This balances crank applied movement and force at the shaft and counterbalances platen force reaction against the cranks at the shaft. This eliminates the necessity for heavy framework to resist and/or support the loads.

In the prior art one platen travels toward and away from a stationary platen. Therefore one platen travels the whole stroke while the other platen remains stationary. Since only one platen moves, it cannot be counterbalanced in weight, movement, force, and/or reaction against the other platen.

The press of the invention is ideally suited to spot welding wherein various parts are welded together in various planes and positions. A workpiece, such as an automobile cowl panel, may require spot welding operations in widely separated planes and positions. The workpiece may be centrally located in the press and the platens moved toward and away from the workpiece on both sides of the workpiece.

Mating welding electrodes are carried by each platen and are advanced and retracted relative to one another and the workpiece. One mating electrode is extended on one platen and the other mating electrode is retracted on the other platen so as to meet in the plane of the spot welding operation on the workpiece. One platen may carry a plurality of variously extending and retracted electrodes and the other platen may carry oppositely extended and retracted mating electrodes.

The extending electrodes on opposite platens must by-pass portions of the workpiece when the press closes and when it opens. These extending electrodes must be withdrawn from the workpiece area to provide workroom in loading and unloading the press. This necessitates a long stroke. Production requires fast action. The press of the invention supplies both.

The double acting press of the invention is particularly advantageous for operating welding electrodes as slide rails may be provided between the platens for supporting workpieces to be welded. The electrodes by-pass the slide rails and engage the workpiece in the closed press position.

The double acting press is useful in "vacuum" and "blow" forming plastics where one platen carries a mold and apparatus and the other platen carries cooperating equipment such as sealing and heating means. In "blow," "vacuum," or press forming items having a deep-shell portion, such as a refrigerator liner for example, a long stroke between the open and shut press positions is required. A refrigerator liner may have a deep-shell portion of twenty inches. The liner upon being formed lies in the mold or die.

In order to remove the liner from the mold, the liner must be raised at least twenty inches to move the liner out of the mold. The other mold or die may have to retract twenty inches to clear the mold and a second twenty inches to clear the liner when it is removed from the first mold to avoid interference. Workroom for removing the liner from between both molds is also required and this may be an additional four to twelve inches.

Thus, the molds must be withdrawn twenty inches to clear the molds, another twenty inches to clear the liner upon its removal from a mold, and another four to twelve inches to provide the necessary workroom. Here the molds must be withdrawn from their advanced position a distance of forty-four to fifty-two inches to their retracted position. When the next liner is formed, the molds must travel the same distance to arrive at the advanced position. The press of the invention moves each platen half the total stroke.

Thus, each platen may move in a twenty-two to twenty-six inch stroke. As the platens are operated by cranks, each crank throw may be eleven to thirteen inches. The cranks are oppositely disposed on a common shaft and a first crank may extend up and a second crank down. The first crank moves down and the second crank moves up in conjunction with shaft rotation through 180 degrees. Reverse or further 180 degree shaft rotation causes the first crank to move up to its initial up position and the second crank to move down to its initial down position.

Thus, they are moving in opposite directions toward one another in the advancing stroke. In the retracting stroke the top platen moves up and the bottom platen moves down. Thus, they are moving in opposite directions away from one another in the retracting stroke. Therefore, at any time or place in motion, the platens are moving in opposite directions. This has several advantageous features.

The oppositely positioned cranks constitute balance arms. The first crank may operate a top platen carrying tools and the second crank operate a bottom platen carrying cooperating tools. The platens so loaded balance one another. If one is heavier, added mass may be added to the other to effect equal balance. Here the power means is not required either to move or hold the entire mass of a platen and associated tools against gravity at any time or place in a stroke.

Moreover, each counterbalanced mass is only travelled a relatively short distance of twenty two to twenty six inches which is only half the travel of a single acting press to achieve a total stroke of fifty two inches. The speed of crank throw may now be increased as the inertia and momentum forces are greatly reduced. Thus the press of the invention may be operated relatively rapidly resulting in high production.

The oppositely disposed cranks also act as force balance arms with the pulling force on one crank being reacted against the pushing force on the other crank at the shaft. The press force between the dies is reacted through the cranks relative to one another with the shaft as medium. Thus, the press of the invention may be relatively light and inexpensive.

With the foregoing in view, it is a primary object of the invention to provide a press having double acting platens wherein the tools carried by each platen are moved in opposite directions to advance and retract relative to one another.

An object of the invention is to provide a press having double platen action with the platens moving towards one another in the advancing stroke and away from one another in the retracting stroke so that each platen only moves half the normal stroke of a press having single platen action.

An object of the invention is to counterbalance one platen and tools relative to the other so that substantially no weight differential exists between them thereby reducing the necessary actuating power and providing balance to eliminate weight differential influence on the harmonic motion.

An object of the invention is to provide primary actuating means having harmonic motion for advancing and retracting the platens relative to one another which has a locking action at the end of both the advancing and retracting strokes to hold the platens in location at the end of each stroke.

An object of the invention is to provide actuating means for advancing the platens and retracting the platens relative to one another which includes a mechanical advantage adjacent the end of the advancing and retracting strokes so that maximum force is exerted at the end of the advancing stroke to apply full pressure to the final forming of a part or workpiece and to hold the dies open and forcefully fixed at the end of the retracting stroke.

An object of the invention is to provide actuating means which has gradual acceleration and deceleration adjacent the ends of the advancing and retracting strokes and maximum speed intermediate the ends of the strokes.

An object of the invention is to divide a long total press stroke between two oppositely moving platens to reduce actuating motion.

An object of the invention is to provide secondary harmonic power applicating means for driving the primary harmonic motion actuating means to compound additively the acceleration, deceleration, intermediate speed, and mechanical advantage features of both means.

An object of the invention is to provide a secondary harmonic power applicating means for driving the primary harmonic actuating means which has a substantially smaller angular movement than the primary harmonic actuating means to reduce the necessary stroke of the power source.

An object of the invention is to further reduce actuation otion by additively compounding primary and secondary harmonic motion means.

These and other objects of the invention will become apparent by reference to the following description of a double-action platen press having an extremely long total stroke developed from a relative very short power cylinder stroke embodying the invention taken in connection with the accompanying drawings in which:

FIG. 1 is a cross-sectional view of FIG. 2 taken on the line 1—1 thereof, partly in elevation, showing the platens in their retracted position.

FIG. 2 is a top plan view of the device seen in FIG. 1.

FIG. 3 is a cross-sectional view of FIG. 2 taken on the line 3—3 thereof, similar to FIG. 1, showing the platens in their advanced position.

FIG. 4 is a view of the operating linkage seen in FIGS. 1 and 3 showing the linkage in an intermediate position between the positions shown in FIGS. 1 and 3.

FIG. 5 is a partial cross-sectional view of FIG. 3 taken on the line 5—5 thereof; and FIG. 6 is a diagrammatic geometric illustration showing the medium motion of the primary actuating means relative to the short motion of the secondary power application means thereto.

Referring now to the drawings, the device disclosed therein to illustrate a preferred embodiment of the invention comprises a top platen 10 and a bottom platen 11 movable relative to each other between the retracted position seen in FIG. 1 and the advanced position seen in FIG. 5. The platens 10 and 11 are moved between their advanced and retracted positions by crank power application means 14. The power application means 14 is controlled by a hydraulic cylinder 15.

The harmonic power application means 14 has a relatively small angular motion such as 90 degrees. The harmonic actuating means 12 has a relatively larger angular motion of 180 degrees for example. The small motion of the power applicating means 14 moves the actuating means 12 through its relatively larger motion. In this way, a short power stroke of the cylinder 15 is developed to a large angular movement without encountering dead center positions. The compound harmonic motion of the platen actuating means 12 and the power application means 14 provides very gradual acceleration and deceleration at the ends of platen travel and a very powerful mechanical advantage adjacent the ends of the advancing and retracting platen strokes. This also provides high speed platen travel intermediate the ends of travel.

More particularly, four posts 20–23 may stand vertically at the four corners of a rectangular floor plate 24. A shaft 25 lies between the upper ends of posts 20 and 21 in suitable bearings and a shaft 26 lies between the upper ends of the posts 22 and 23 in suitable bearings. The shafts 25 and 26 may be considered paired, spaced, and parallel relative to one another.

Each shaft 25 and 26 has paired first cranks 30. An arm link 31 is connected to each crank 30 by a pivot pin 32 and to a leg link 33 by a pivot pin 34. The leg link 33 is connected to the top platen 10 by a stud 35. The stud 35 may support a roller 36 which engages the inner sides of the legs 20–23. The legs 20–23 may be channel shaped for this purpose.

Paired cranks 40 are also fixed on each shaft 25 and 26. The cranks 30 and the cranks 40 are diametrically opposed to one another lying 180 degrees apart. An arm link 41 is connected to each crank 40 by a pivot pin 42 and to a leg link 43 by a pivot pin 44. The leg link 43 is connected to the bottom platen 11 by a stud 45. The stud 45 may also support a roller 46 engaging the channel portions of the legs 20–23.

The operation of the device so far particularly described is as follows. In the open position of the platens 10 and 11, FIG. 1, the cranks 30 extend upwardly elevating the arm link 31, leg link 33, and the upper platen 10. The cranks 40 extend downwardly dropping the arm link 41, leg link 43, and bottom platen 11.

As the shafts 25 and 26 rotate 90 degrees from the position of FIG. 1 to the position of FIG. 4, the cranks 30 and 40 extend sidewardly. The crank 40 has swung up from the position of FIG. 1 to the position of FIG. 2 partially raising the bottom platen 11. The crank 30 has swung downwardly from the position of FIG. 1 to the position of FIG. 4 partially lowering the top platen 10.

Further angular movement of the shafts 25 and 26 from the position of FIG. 4 to the position of FIG. 5, swings the crank 30 to extend downwardly dropping the arm link 31 and leg link 33 to lower the top platen 10 its full stroke. The crank 40 now extends upwardly elevating the arm link 41 and leg link 43 moving the bottom platen 11 upwardly its full stroke. It can now be seen that the platens 10 and 11 lie adjacent one another, FIG. 5.

The shafts 25 and 26 carry a torque lever 27 and 28 respectively. Each torque lever 27 and 28 has a cam track 29 extending radially from its respective shaft 25 and 26. The shafts 25 and 26 are moved angularly by the torque levers 27 and 28. The torque levers 27 and 28 are moved angularly by a cam 50 and 51 lying in their cam tracks 29. The cams 50 and 51 are interconnected by a tie-rod 52. The torque arms 27 and 28 are disposed normal to both cranks 30 and 40 and swing in angular movement from the position seen in FIG. 1, through the position seen in FIG. 4, to the position of FIG. 5. The torque arms 27 and 28 swing in a 180 degree arc to move the cranks 30 and 40 180 degrees from the position of FIG. 1 to the position of FIG. 5. This moves the platens 10 and 11 their full stroke. In the embodiment illustrated, the platens 10 and 11 are moved in their reverse stroke by reverse angular movement of the arms 27 and 28.

The arm links 31 and 41 are preferably off-set to permit the pivot pins 32 and 42 to lie in a dead center position over and under center relative to the shafts 25 and 26 on a vertical diameter normal to the platens 10 and 11. This location is true both in FIGS. 1 and 5 at both ends of travel of the platens 10 and 11. It will be understood that cranks 30 and 40, arm links 31 and 41, and pivot pins 32 and 42 respectively, approach a dead center diametrical position relative to one another at the end of travel of the platens 10 and 11.

This toggle action drives the platens 10 and 11 with increased mechanical force at the end of travel. In the position of FIG. 4 the cranks 30 and 40 have least mechanical advantage and greatest speed in moving the platens 10 and 11.

In this way the power applicating means 12, embodying the cranks, links, shafts, and torque arms, produces a simple harmonic motion driving the platens 10 and 11 with smooth acceleration and deceleration at the ends of travel and high speed travel intermediate the ends of travel. This harmonic motion inherently involves the powerful toggle camming effect as the pivot pins 32 and 42 move over and under the shafts 25 and 26 extremely forcefully moving the platens 10 and 11 at their ends of travel.

Referring now to the harmonic power application means 14 which drives the torque arms 27 and 28 of the harmonic actuating means 12, cam levers 60 and 61 are pivotally mounted on a frame 62 as at 54 and 55 respectively. These pivot points 54 and 55 are located directly below and at one side of dead center of the shafts 25 and 26 respectively. The levers 60 and 61 support the cams 50 and 51 respectively on the other side of center of the shafts 25 and 26. The levers 60 and 61 may be provided with an arcuate slot 66 and 67 respectively for by-passing the shafts 25 and 26 respectively. The cam levers 60 and 61 swing the cams 50 and 51 respectively from the position of FIG. 1 through the position of FIG. 4 to the position of FIG. 5 and also in the reverse direction. One of the cam levers, such as the cam lever 61, may carry a power arm 68 connected to a piston rod 69 operated by a piston in a hydraulic cylinder 15. Outward movement of the piston rod 69 therefore moves the cam levers 60 and 61 from the position of FIG. 1 through the position of FIG. 4 to the position of FIG. 5. Inward movement of the piston rod 69 reverses this action.

FIG. 6 shows that the cam lever 60 swings in a 90 degree arc moving the cam 50 from the position of letter A to the position of letter B. The arcuate movement of the cam 50 in a 90 degree arc cams the torque lever 27 through a 180 degree arc as shown.

The cam 50 in its arcuate movement relative to the torque arm 27 moves from the outer radial position adjacent the torque arm 27 at either end of its stroke to an inner radial position adjacent the shaft 25 intermediate the ends of the torque arm 27 stroke. With constant arcuate movement of the cam lever 60, the cam 50 applies gradual aceleration and deceleration of motion of the torque arm 27 adjacent the ends of its arcuate movement. The cam 50 with constant motion of the cam arm 60 provides highest speed of arcuate movement to the torque arm 27 intermediate its ends of travel.

Also the cam 50 applies the greatest force with the greatest mechanical advantage adjacent the end of travel of the torque arm 27 and least force with least mechanical advantage intermediate the ends of travel of the torque arm 27. Thus, the power application means 14, including the cylinder 15, power arm 68, cam levers 60 and 61, and cams 50 and 51, by a smooth harmonic motion applies power to the harmonic actuating means 12. The slowest motion and greatest mechanical advantage of both means 12 and 14 are adjacent the ends of travel of the platens 10 and 11. Also the greatest speed of motion of both the means 12 and 14 is intermediate the ends of the travel of the platens 10 and 11.

Thus, the harmonic motion of the actuating means 12 and the harmonic motion of the power application means 14 are additive to one another both in speed and mechanical advantage. This allows the cylinder 15 to move the piston rod 69 and power lever 68 in a short stroke with resultant long travel in the platens 10 and 11. It allows the cylinder 15 to move the platens 10 and 11 with greatest speed and least force intermediate their ends of travel. It also provides greatest mechanical advantage and slowest speed adjacent the ends of travel of the platens 10 and 11.

Relative to counterbalancing the platens 10 and 11 and associated means a heavier tool may be positioned on the bottom platen 11. To counterbalance the difference in weight pig iron may be fixed on the upper platen 10. Obviously, the tools and counterbalancing weight masses may be reversed if desired.

The counterbalancing becomes possible due to the fact that the platens 10 and 11 travel in opposite directions, travel equal distances, and move with equal force at the same time. With the platens and tools equally counterbalanced, it is obvious that the platen actuating means and power applicating means are only required to properly position the platens and tools and to apply the necessary force to engage the tools. Thus, with the equally counterbalanced platens 10 and 11, it is never necessary to provide power means having an excess capacity as the power means is not required to move an unbalanced load in addition to the load of engaging the tools.

The platens may advance and retract the electric welding electrodes and holders relative to one another. In this use of the press of the invention, paired guide rails 70 and 71 may extend through the press midway between the platens 10 and 11. A workpiece 72 may be positioned on the guide rails 70 and 71. The rails extend outwardly on either side of the press so that workpiece may slide along the rails into and out of the press and rest on the rails within the press. A plurality of electrodes may be used.

Paired electrodes 73 and 74 may be carried by the platens 10 and 11 respectively. Paired electrodes 75 and 76 may be also carried by the platens 10 and 11 respectively. The electrodes 73 and 74 may weld the workpiece 72 in a different vertical position than the paired electrodes 75 and 76. Electrode holders, not shown, may be provided for adjusting the position of each electrode relative to its paired electrode and also relative to the workpiece surface to be welded.

After the workpiece 72 is positioned within the press, FIG. 1, the press may be actuated to the position of FIG. 3 whereupon the electrodes are advanced into contact with the workpiece and effect welding. The bottom electrodes 74 and 76 may be advanced slightly beyond the press center to slightly elevate the workpiece 72 above the slide rails 70 and 71 in the shut position to obviate any interference between the workpiece, electrodes, and rails. This obviates any shock or binding between the workpiece, the electrodes, and the rails.

As the motion of the bottom platen 11 is extremely slow at the point of contact between the bottom electrodes 74 and 76 with the workpiece 72 closing, the workpiece 72 is slowly and gently lifted above the rails 70 and 71 as the press closes. As the press opens the workpiece 72 is slowly and gently set back on the slide rails 70 and 71.

The press of the invention provides a particularly efficient mechanism for welding parts between the platens as both platens advance toward the workpiece. This permits the workpiece to be centrally positioned. This obviates the necessity of positioning the workpiece at a low lever adjacent the press bottom. This also obviates the necessity of a long travel in the press top. Thus, the guide rails 70 and 71 may be conveniently positioned at middle height which facilitates loading and unloading by workmen and/or automatic transfer means. The full clearance of the workpiece between the platens in the press open position allows the workpiece to be easily inserted and easily removed from the press.

As illustrated, the press may have an open height between the platens 10 and 11 of fifty four inches and a shut height between the platens 10 and 11 of twelve inches.

The open height and the shut height of the platens may be easily adjusted by changing the length of the legs or links in any one press having a set crank throw. Obviously, the oppositely disposed cranks may be of different throw if desired.

As shown and described, both arm links and leg links are employed between the platens and the cranks. Obviously, a single link can be used between the cranks and a scissoring action allowed in conjunction with crank throw such as illustrated in conjunction with the arm links 31 and 41 of FIG. 4. In other words, a single link can lead from the cranks to the platens.

While the platens have been shown in top and bottom positions, it is obvious that the platens can be used in a side-by-side position and the operating linkage disposed at one side of the platens moving them sidewise inwardly and sidewise outwardly in operation. Obviously, weight counterbalancing in this position is not necessary. However, the force reaction equalization is still effective in that the force in closing or opening the platens will be reacted between the platens via the links, cranks, and shafts. Thus, only a light guiding framework is necessary to support the operating parts.

While two harmonic actuating mechanisms have been shown and described operating the platens, any suitable power means can be used to move the platens toward one another and away from one another by turning the shafts which support the cranks. While the device has been described in conjunction with advance 180 degree rotation and reverse 180 degree rotation, it is obvious that the oppositely disposed cranks can be opened through the shaft, as in an engine crankshaft, thereby facilitating 360 degree rotation in one direction.

Although but a single embodiment of the invention has been shown and described in detail, it is obvious that many changes may be made in the size, shape, detail, and arrangement of the various elements of the invention within the scope of the appended claims.

I claim:

1. A double platen action harmonic press comprising paired spaced parallel shafts lying in a horizontal plane,
support means and bearing means rotatably supporting said shafts above a floor plane,
means rotationally interconnecting said shafts for substantially identical angular movement,
at least one first radial crank on each said shaft,
at least one second radial crank on each said shaft at 180 degrees from said first crank;
and power means on said support means from rotating said shafts to swing said cranks to actuate said platens;
both said first and second cranks on said shafts normally lying in a vertical plane with said first crank having an outer end extending upwardly and said second crank having an outer end extending downwardly;
normally widely spaced top and bottom platens below said shafts,
a link interconnecting each said first crank outer end with said top platen,
a link interconnecting each said second crank outer end with said bottom platen;
pivot pins and bearings connecting said links to said cranks and platens at pivot points;
said cranks swinging with said shafts to locate their outer ends in opposite down and up locations upon 180 degree rotation of said shafts so that said first crank outer end extends downwardly and said second crank outer end extends upwardly;
said top platen and links moving downwardly with said first crank outer end with 180 degree rotation of said shaft;
said bottom platen and links moving upwardly with said second crank outer ends with 180 degree rotation of said shafts;
said platens thereby moving towards one another from their normal wide spaced position to a close spaced position in conjunction with 180 degree rotation of said shafts;
said shafts upon further 180 degree rotation swinging said cranks to their normal vertical position moving said top platen upwardly and said bottom platen downwardly to their normal wide spaced locations;
said shafts, cranks, links, and pins coacting in a toggle action at the beginning and end of 180 degree angular movement of said shafts to forcefully urge said platens together in the initial 180 degree shaft rotation and to forcefully urge said platens apart in the subsequuent 180 degree shaft rotation.

2. In a device as set forth in claim 1, said means rotationally interconnecting said shafts including
a torque arm fixed on at least one of said shafts lying at an angle normal to said first and second cranks;
said torque arm having a radial cam track,
a cam lying in said torque arm cam track on one side of center of said shaft;
a lever having a first end supporting said cam and a second end pivotally fixed on the other side of center of said shaft so that said lever swings said cam in an eccentric path relative to said shaft, torque arm, and cam track,
said power means on said support means actuating said lever to swing said cam relative to said torque arm cam track to move said torque arm 180 degrees;
said lever swinging said cam in an arc on a greater radius than said torque arm so that 90 degree cam angular movement drives said torque arm through 180 degrees angular movement;
said lever cam and torque arm moving in simple harmonic motion to position said cam relative to said torque arm for greatest speed of movement and least mechanical advantage adjacent the center of its stroke and least speed of movement and greatest mechanical advantage adjacent the ends of its stroke to coordinate its action with like action in the toggle action of said shafts, cranks, links, and pins in actuating said platens.

3. A double platen action harmonic press comprising paired spaced shafts, support means and bearing means rotatably supporting said shafts, means rotationally interconnecting said shafts for substantially identical angular movement, power means on said support means for rotating said shafts,
at least one first crank on each said shaft, at least one second crank on each said shaft at 180 degrees from said first crank;

both said first and second cranks on said shafts normally lying in a plane with said first crank having an outer end extending in one direction such as outwardly and said second crank having an outer end extending in the opposite direction such as inwardly;

normally widely spaced near and far platens adjacent said shafts, a link interconnecting each said first crank outer end with said near platen, a link interconnecting each said second crank outer end with said far platen;

pivot pins connecting said links to said cranks and platens at pivot points;

said cranks swinging with said shafts to locate their outer ends in opposite far and near locations upon 180 degree rotation of said shafts so that said first crank outer end extends inwardly and said second crank outer end extends outwardly relative to said shafts;

said near platen and links moving outwardly with said first crank outer ends with 180 degree rotation of said shaft;

said far platen and links moving inwardly with said second crank outer ends with 180 degree rotation of said shafts;

said platens thereby moving towards one another from their normal wide spaced position to a close spaced position in conjunction with 180 degree rotation of said shafts;

said shafts upon further 180 degree rotation swinging said cranks to their normal position moving said near platen inwardly and said far platen outwardly to their normal wide spaced locations;

said shafts, cranks, links, and pins coacting in a toggle action at the beginning and end of 180 degree angular movement of said shafts to forcefully urge said platens together in the initial 180 degree shaft rotation and to forcefully urge said platens apart in the subsequent 180 degree shaft rotation.

4. In a device as set forth in claim 3, said means rotationally interconnecting said shaft including a torque arm fixed on at least one of said shafts having a radial cam track;

said torque arm swinging in a 180 degree arc to swing said shaft and said cranks in a 180 degree stroke;

said torque arm arc having a relatively short radius;

a cam lying in said torque arm cam track on one side of said shaft, a lever having a pivot end pivotally mounted on the other side of said shaft relative to said torque arm and a swing end extending past said shaft supporting said cam for swinging movement with said lever;

said cam arc having a relatively long radius;

said power means on said support means swinging said lever;

said lever swinging said cam in a relatively short arc such as a 90 degree eccentric arc relative to said shaft so as to intersect a diameter of said torque arm arc on both sides of said shaft;

said cam thereby moving said torque arm from a radial position at one side of said shaft axis to a radial position diametrically at the other side of said shaft axis thereby swinging said torque arm in a 180 degree stroke to turn said shaft 180 degrees;

said lever, cam, and torque arm moving in simple harmonic motion to position said cam relative to said torque arm for greatest speed of movement and least mechanical advantage adjacent the center of said torque arm stroke and least speed of movement and greatest mechanical advantage adjacent the ends of said torque arm stroke to coordinate its speed and motion with like speed and motion in the toggle action of said shafts, cranks, links, and pins in actuating said platens.

References Cited in the file of this patent

UNITED STATES PATENTS

| | | |
|---|---|---|
| 95,411 | Baldwin | Oct. 5, 1869 |
| 435,212 | Deane | Aug. 26, 1890 |
| 1,062,465 | Hill | May 20, 1913 |
| 1,538,635 | Hahn | May 19, 1925 |

FOREIGN PATENTS

| | | |
|---|---|---|
| 290,537 | Great Britain | May 17, 1928 |
| 417,373 | Germany | Aug. 10, 1925 |